United States Patent
Zhao et al.

(10) Patent No.: US 8,849,799 B1
(45) Date of Patent: Sep. 30, 2014

(54) CONTENT SELECTION USING BOOLEAN QUERY EXPRESSIONS

(75) Inventors: Gaofeng Zhao, Santa Clara, CA (US); Claire Cui, Palto Alto, CA (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 13/467,881

(22) Filed: May 9, 2012

(51) Int. Cl.
*G06F 17/30* (2006.01)

(52) U.S. Cl.
USPC .......................................... 707/721; 707/748

(58) Field of Classification Search
CPC ................................................. G06F 17/30926
USPC ........................................................ 707/721
See application file for complete search history.

(56) References Cited

U.S. PATENT DOCUMENTS

| | | | |
|---|---|---|---|
| 7,890,369 B2 | 2/2011 | Mooney | |
| 8,195,655 B2 * | 6/2012 | Agrawal et al. | 707/730 |
| 2005/0222989 A1 | 10/2005 | Haveliwala et al. | |
| 2009/0112844 A1 | 4/2009 | Oro | |
| 2009/0319517 A1 * | 12/2009 | Guha et al. | 707/5 |
| 2010/0057559 A1 | 3/2010 | Wilf et al. | |

OTHER PUBLICATIONS

Brin et al., "The anatomy of a large-scale hypertextual Web search engine", 1998, Elsevier Science B.V., pp. 107-117.*
IBM, "Method and System of Adaptive Advertising," Technical Disclosure, Oct. 15, 2009 (4 pages).

* cited by examiner

*Primary Examiner* — Hung Q Pham
(74) *Attorney, Agent, or Firm* — Foley & Lardner LLP; John D. Lanza

(57) ABSTRACT

Systems and methods of selecting supplemental content for a document in a computer network environment. A data processing system can receive a notification of a request for a document. The data processing system can access a set of Boolean query expressions stored in association with a plurality of supplemental content records and identify a subset that are satisfied by the document. The data processing system can determine a document relevance score for each query expression in the subset. The score may be based, in part, on a feature of a document token that contributes to satisfying the respective query expression. The data processing system can select an expression from the subset based on the scores and select a supplemental content record associated with the selected Boolean query expression. The data processing system can output data for supplementing the document with a content indicated by the selected supplemental content record.

20 Claims, 3 Drawing Sheets

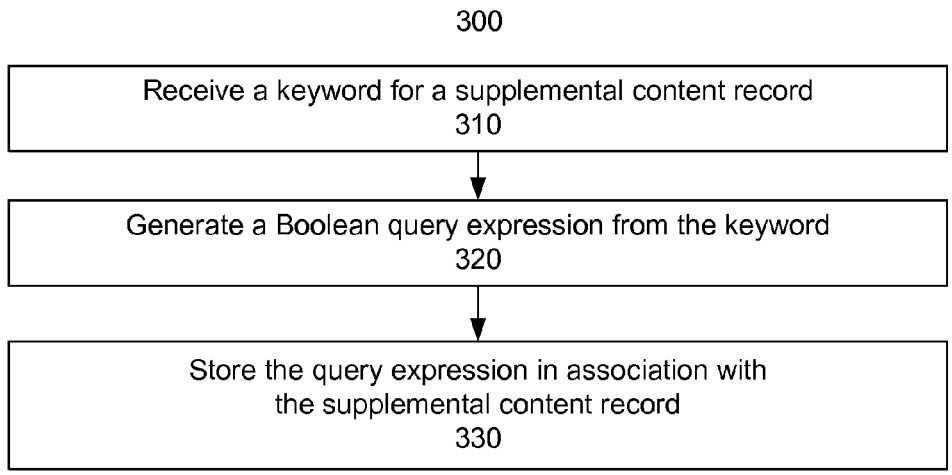
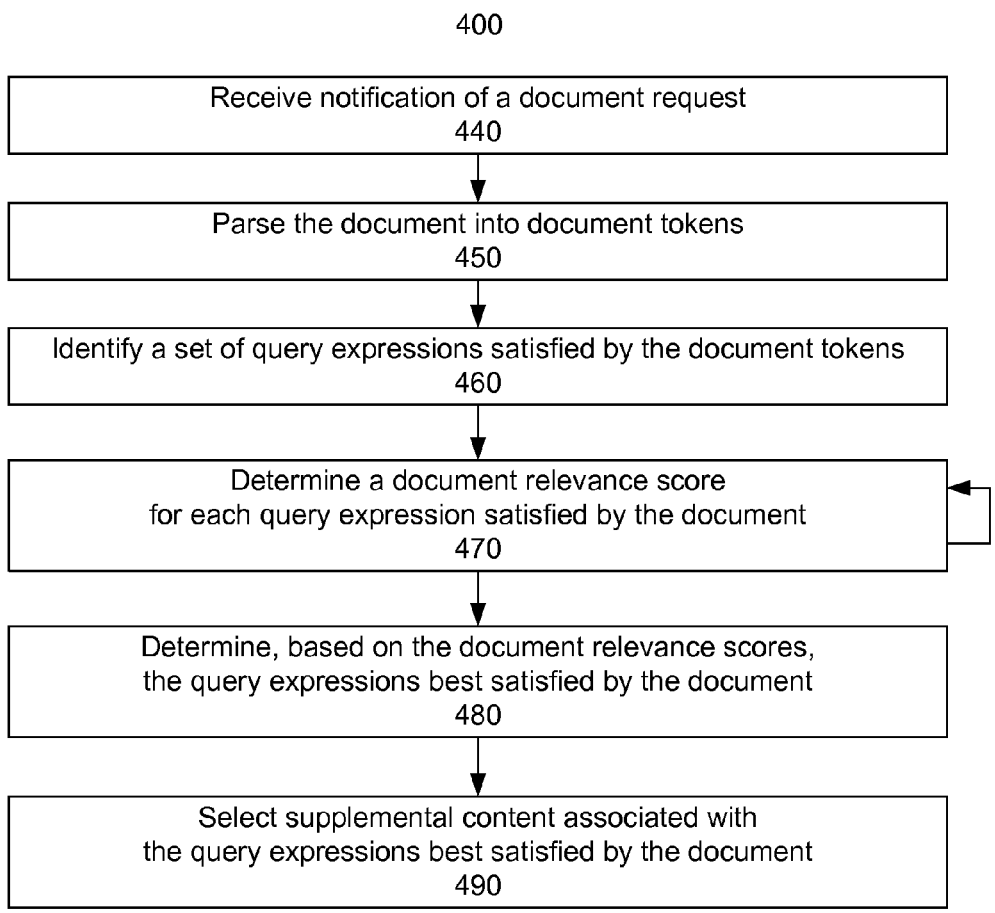

CONTENT SELECTION USING BOOLEAN QUERY EXPRESSIONS

BACKGROUND

In a networked environment such as the Internet, it is often desirable to pair one or more supplemental documents, such as advertisements (or "ads"), with a requested document, such as a web page. A document viewer's experience may be enhanced by supplemental content that is of interest to the viewer. For example, a requested web page may be displayed along with one or more advertisements provided as supplemental content. These ads are selected based on a variety of criteria, often with the end goal of soliciting a reaction such as exploration of the document via a click-through and, in some cases, the conversion of the click-through into a transaction for value.

SUMMARY OF THE INVENTION

Aspects and implementations of the present disclosure are directed to systems and methods of selecting supplemental content for a document. In general, in some implementations, a content selection system selects supplemental content for a document using Boolean query expressions stored in association with content records. The content selection system identifies a subset of the query expressions that are satisfied by the document and determines how relevant the document is to each identified query expression. The content selection system selects content to be delivered with the document based on the satisfied query expressions and the determined relevance, for example, by selecting the content associated with the query expression for which the document is most relevant.

At least one aspect is directed to a computer implemented method of selecting supplemental content for a document by receiving a notification of a request for the document, accessing a set of Boolean query expressions stored in association with a plurality of supplemental content records, identifying a subset of the set of Boolean query expressions that are satisfied by the document, determining a document relevance score for each Boolean query expression in the subset based on at least one feature of at least one token in the document that contributes to the satisfaction of the respective Boolean query expression, selecting a Boolean query expression from the subset of Boolean query expressions based on the determined scores, selecting a supplemental content record associated with the selected Boolean query expression; and outputting data for supplementing the document with content indicated by the selected supplemental content record.

At least one aspect is directed to a system of selecting supplemental content for a document, the system comprising a data processing system having at least one of a query processing module and a scoring module, the data processing system configured to receive a notification of a request for the document; access a set of Boolean query expressions stored in association with a plurality of supplemental content records; identify a subset of the set of Boolean query expressions that are satisfied by the document; determine a document relevance score for each Boolean query expression in the subset based on at least one feature of at least one token in the document that contributes to the satisfaction of the respective Boolean query expression; select a Boolean query expression from the subset of Boolean query expressions based on the determined scores; select a supplemental content record associated with the selected Boolean query expression; and output data for supplementing the document with content indicated by the selected supplemental content record.

At least one aspect is directed to a system of selecting supplemental content for a document, the system comprising at least one computer processor configured to execute instructions and a computer readable storage medium communicatively coupled with the at least one computer processor, the medium storing instructions, which, when executed by the at least one computer processor, cause the at least one processor to receive a notification of a request for the document; access a set of Boolean query expressions stored in association with a plurality of supplemental content records; identify a subset of the set of Boolean query expressions that are satisfied by the document; determine a document relevance score for each Boolean query expression in the subset based on at least one feature of at least one token in the document that contributes to the satisfaction of the respective Boolean query expression; select a Boolean query expression from the subset of Boolean query expressions based on the determined scores; select a supplemental content record associated with the selected Boolean query expression; and output data for supplementing the document with content indicated by the selected supplemental content record.

At least one aspect is directed to a non-transitory computer-readable storage medium storing processor executable instructions, which, when executed by at least one processor, cause the processor(s) to receive a notification of a request for the document; access a set of Boolean query expressions stored in association with a plurality of supplemental content records; identify a subset of the set of Boolean query expressions that are satisfied by the document; determine a document relevance score for each Boolean query expression in the subset based on at least one feature of at least one token in the document that contributes to the satisfaction of the respective Boolean query expression; select a Boolean query expression from the subset of Boolean query expressions based on the determined scores; select a supplemental content record associated with the selected Boolean query expression; and output data for supplementing the document with content indicated by the selected supplemental content record.

In some implementations, e.g., where the document is a web page, the content indicated by the selected supplemental content record identified by the method, system, or executed computer-executable instructions is delivered for display with the web page. In some implementations, the document relevance score takes into account a feature that is one of a text format, a language aspect, and a document relation factor, such as, location within the document or number of occurrence of the token within the document and a relative frequency.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a flow diagram depicting a method of processing information in a computer network; and FIG. 4 is a flow diagram depicting a method of selecting supplemental content for a document in a computer network.

DETAILED DESCRIPTION

Following below are more detailed descriptions of various concepts related to, and implementations of, methods of, apparatuses for, and systems for expanding keywords for high performing keywords. The various concepts introduced above and discussed in greater detail below may be implemented in any of numerous ways, as the described concepts are not limited to any particular manner of implementation. Examples of specific implementations and applications are provided primarily for illustrative purposes.

Systems and methods in the present disclosure are directed towards selecting supplemental content with a high likelihood of interest to a user requesting a document. In general, an exemplary provider of supplemental content is an advertiser and an exemplary document is a web page, e.g., a web page designed with space designated for inclusion of one or more advertisements. Other uses of supplemental content can also benefit from the present disclosure.

In general, in some implementations, a content selection system selects supplemental content for a document using Boolean query expressions stored in association with content records. The content records are in turn associated with items of supplemental content. The content selection system identifies a subset of the query expressions that are satisfied by the document and determines how relevant the document is to each identified query expression. The content selection system selects content to be delivered with the document based on the satisfied query expressions and the determined relevance, e.g., selecting the content associated with the query expression for which the document is most relevant.

Figure 1:
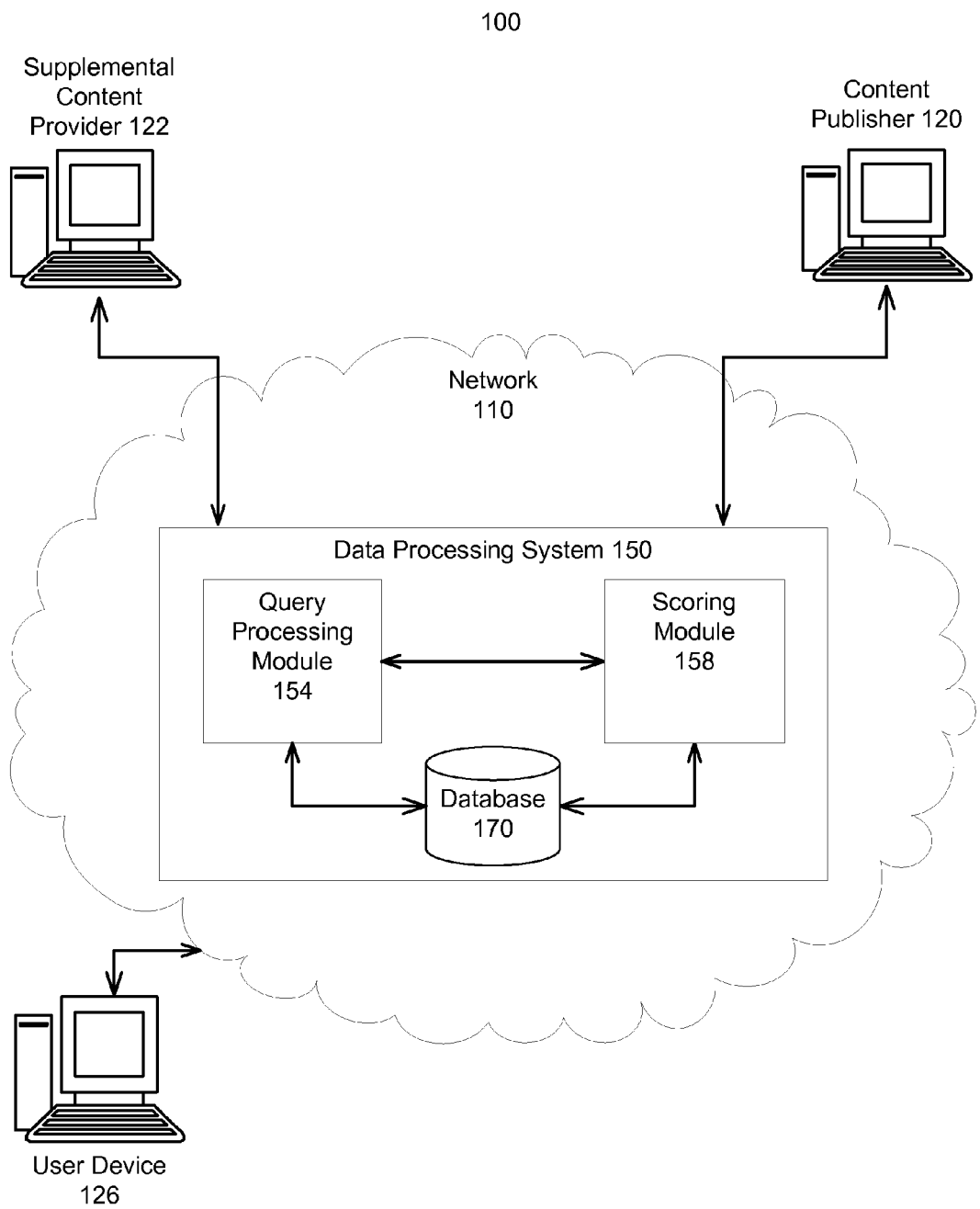
FIG. 1 is a block diagram depicting an example environment to evaluate information on a computer network, according to an illustrative implementation.

FIG. 1 illustrates an example system 100 for providing supplemental content to a user device 126 via a computer network such as network 110 according to an implementation of the present disclosure. The network 110 can include computer networks such as the Internet, local, metro, or wide area networks, intranets, and other communication networks such as mobile telephone networks. The network 110 can be used to access web pages that can be displayed on at least one user device 126, such as a laptop, desktop, tablet, personal digital assistant, smart phone, television, or portable computer. For example, via the network 110, a user of the user device 126 can access web pages provided by a content publisher 120. In this example, the user device 126 uses software, such as a web browser, to access a web server and retrieve a web page for display on a monitor of the user device 126. The web server may be the content publisher 120 or an intermediary host.

The system 100 includes at least one data processing system 150 that, for example, can include at least one processor or other logic device to communicate via the network 110 with at least one content provider 120 and at least one supplemental content provider 122. The example data processing system 150 shown includes a query processing module 154 configured to determine if a query is satisfied by a document requested via the network 110, a scoring module 158 configured to evaluate the relevance of a document component to the document or the relevance of the document to a query satisfied by the document, and at least one data repository or database 170. The data processing system 150 can include or communicate with a content selection server, a content host server, a content placement server, and other data processing systems.

The data processing system 150 includes an interface configured to receive a request via the network 110 to identify supplemental content for delivery with a document. The data processing system 150 may receive the request after the user device 126 requests access to the document and before the document is fully delivered to, or rendered on, the user device 126. In some implementations, the query processing module 154 and the scoring module 158 are special purpose logic circuits, e.g., application-specific integrated circuits (ASICs). In some implementations, the modules include one or more processors executing instructions encoded as firmware or software on communicatively coupled computer readable media.

Figure 2:
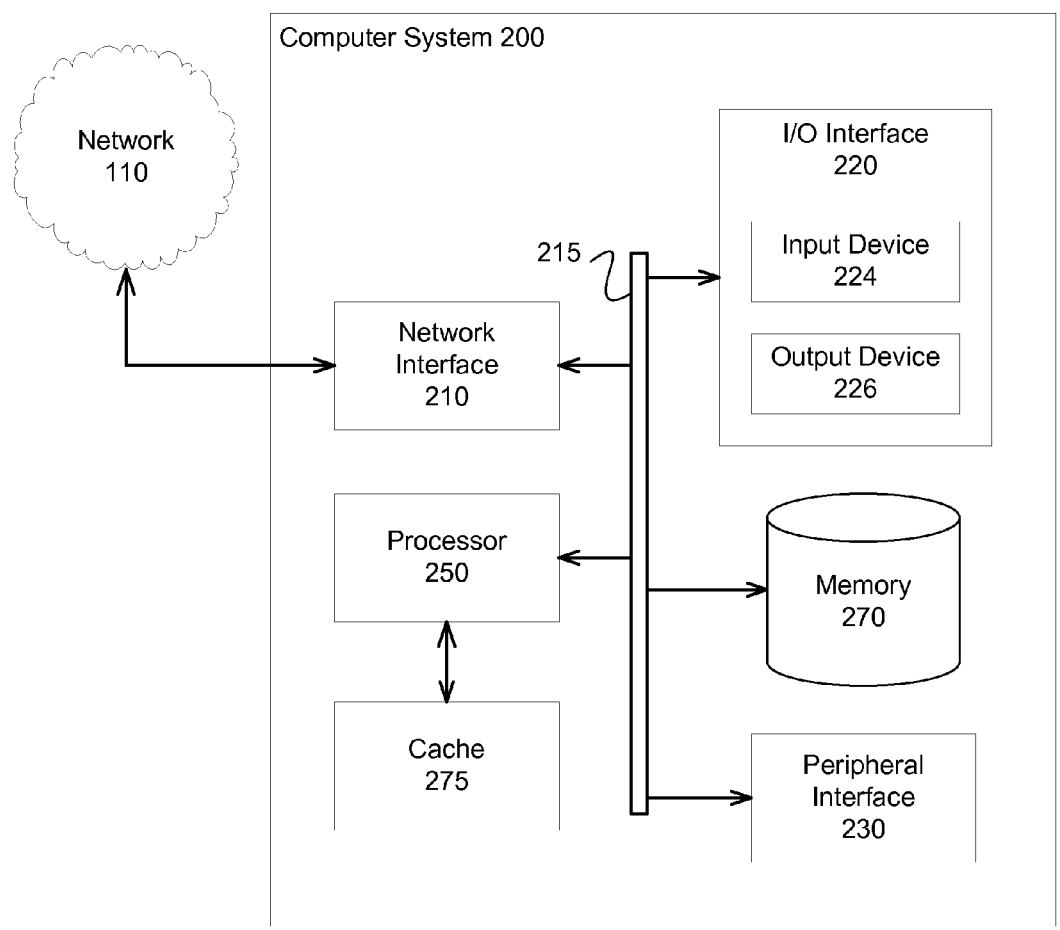
FIG. 2 is a block diagram illustrating an example computer system that may be employed to implement various elements of the systems and methods described and illustrated herein, according to an illustrative implementation.

FIG. 2 illustrates an example computer system 200 suitable for use in implementing the computerized components of the system 100. The example computer system 200 includes one or more processors 250 in communication, via a bus 215, with one or more network interfaces 210 (in communication with the network 110), I/O interfaces 220 (for interacting with the user), and memory 270. The processor 250 incorporates, or is directly connected to, additional cache memory 275. In some uses, additional components are in communication with the computer system 200 via a peripheral interface 230. In some uses, such as in a server context, there is no I/O interface 220, or the I/O interface 220 is not used.

In some implementations, the user device 126 is constructed to be similar to the computer system 200 of FIG. 2. For example, a user interacts with an input device 224, e.g., a keyboard, mouse, or touch screen, to request a web page to be delivered over the network 110, received at interface 210, and output via output device 226, e.g., a display, screen, touch screen, or speakers. The request can be processed by the data processing system 150 to identify supplemental content from provider 122 for delivery with content from publisher 120 based on placement criteria or a satisfied query.

When a web page is requested by a user device 126, a supplemental content placement system, e.g., data processing system 150, determines one or more items of supplemental content, e.g., ads, to present with the requested web page. In some implementations, the placement system determines what supplemental content to deliver based on placement criteria, e.g., a keyword. The placement system determines the supplemental content to deliver based at least on a query stored in association with a content record.

In general, a supplemental content provider (e.g., an advertiser) supplies or indicates content and instructions, e.g., an advertisement including one or more of text, media, and a click response, such as a URL of a landing page to be fetched if a user clicks on the advertisement. All together, these aspects make up a supplemental content record. In some implementations, the supplemental content record may include classification or category data, one or more keywords that may be used to identify web pages with which the content should be provided, and additional information related to the content. A supplemental content record may be stored in a single unit (e.g., a file, database record, or object) or as a collection of distinct storage units (e.g., multiple files, various entries in multiple relational database tables, or multiple objects). Alternative supplemental content records including less, more, or alternative data related to the supplemental content may be employed without departing from the scope of the invention.

FIG. 3 is a flow chart flow chart illustrating an example method 300 for converting a keyword into a query stored in association with supplemental content. The method 300 receives a keyword for a supplemental content record (step 310) and generates a Boolean query expression from the keyword (step 320). The method 300 then stores the query expression in association with the supplemental content record (step 330).

As set forth above, the method 300 begins with the receipt of a keyword (step 310). A keyword may be a single word, a phrase, a name, or any other series of words, numbers, or component elements. A keyword is generally related to a supplemental content in that the keyword can be used to identify a document with which the supplementary content should be delivered. For example, a data processing system can compare the keyword with features of a document (e.g., by comparing components of the keyword with the document's title, content, or metadata) and determine if the supplemental content (e.g., an ad) should be delivered with the document (e.g., provided for display with a web page). A keyword may be supplied by a supplementary content provider, chosen by an analyst or market expert, or determined by an automated system.

After the keyword is received (step 310), it is converted into a Boolean query expression (step 320). A query expression may be a string of terms, e.g., keywords, words, phrases, numbers, topics, and titles, that are linked together with Boolean operators, e.g., AND, OR, NOT. Additional query constraints, such as support for wildcards (e.g., * or %) or context requirements (e.g., that a term must be in a header, or within some relative distance from another term), may also be specified. In some implementations, the Boolean query expressions are created manually. In other implementations, the Boolean query expressions are created in an automated manner, with or without manually entered guidance.

Boolean query expressions may be formed, for example, by first parsing the received keyword into constituent elements. The constituent elements may then be filtered based on one or more filtering criteria, e.g., filtering based on relevance of the element to content associated with the keyword, filtering based on general usefulness of the element in providing supplemental content, or filtering based on a frequency of the element in common usage. Then, in some implementations, related terms, root words, and synonyms for words within the constituent elements are selected as additional elements. Related terms may be determined, for example, by a database lookup. The additional elements may also be subjected to filtering. The constituent elements, and any additional elements, which have not been filtered out are joined using appropriate Boolean operators.

One or more Boolean query expressions may be created from a keyword. In some implementations, an expert selects preferred expressions from a set of generated expressions. In addition, or in the alternative, in some implementations a score is determined for each query expression in the set of generated expressions and only the query expression with the best score, or the query expressions with scores above a threshold, are used. As an example of converting a keyword into a query expression, the keyword "car insurance" might be converted to "car OR insurance," where "OR" is a logical disjunction. In another example, "car insurance" might be converted to "(car OR vehicle) AND (insurance)".

The query expressions are stored (step 330) in a repository, e.g., a database. A query expression may be stored in association with either a keyword, a supplemental content record, or both. As will be shown, when the data processing system receives notification of a document request, e.g., a user loading a web page, the data processing system accesses the query expression repository and identifies the query expressions that are satisfied by the requested document.

FIG. 4 is a flow chart flow chart illustrating an example method 400 for selecting supplemental documents associated with query expressions satisfied by a document suitable for execution by the data processing system 150 of FIG. 1. The exemplary method 400 begins with data processing system 150 receiving a notification of a document request (step 440). The requested document is fetched (either from a host computer or a document cache) and, if not already processed, parsed into tokens (step 450). The data processing system 150 identifies a set of query expressions satisfied by the document (step 460). For each satisfied query expression, the data processing system 150 determines a document relevance score reflecting the relevance of the document to the query expression (step 470). The data processing system 150 then determines, based on the document relevance scores, the query expressions best satisfied by the document (step 480) and selects one or more supplemental documents associated with those query expressions (step 490).

In order to identify query expressions satisfied by the document, the requested document is parsed into tokens (step 450). The data processing system 150 then identifies stored query expressions satisfied by one or more tokens (step 460). In some implementations, the tokens may be broadened by using synonyms, root words, and related terms. The data processing system 150 then identifies stored query expressions satisfied by one or more tokens, including the broadened tokens. In some implementations, only a subset of the document is used to identify satisfied query expressions. For example, a token priority score is determined for each token with respect to the document and only the tokens most relevant to the document (e.g., only the tokens with a token priority score above a threshold) are used in the satisfaction of query expressions. The token priority score can be, but is not required to be, equivalent to the token relevance score presented below. In some implementations, the satisfied query expression identification may be performed by a text search application running on a server. In some implementations, the satisfied query expression identification may be performed using a reverse search infrastructure.

When multiple Boolean query expressions are found to be satisfied by the document, the data processing system 150 determines a score reflecting the relevance of the document to each query expression (step 470). For example, a page might satisfy query expressions derived from the keywords "cheese" and "dairy farm." These keywords might be used for serving different ads related to the respective keywords. If the page is about dairy farming in general, and just happens to mention cheese, it may be that the page has a high relevance score for "dairy farm," but a lower relevance score for "cheese." Alternatively, if the page is about cheese making and just happens to mention dairy farms, it may be that the page has a high relevance score for "cheese," but a lower relevance score for "dairy farm." The scoring module 158 of the data processing system 150 may be used to determine a score reflecting the relevance of a document to a query expression satisfied by the document, referred to herein as a "document relevance score."

In some implementations, to determine the document relevance score, a separate token relevance score is determined for each of the tokens used to satisfy the query. The token relevance score reflects the relevance of the particular token to the document, as explained in more detail below. A document relevance score for the relevance of a document to a query is then determined from an aggregation of the token relevance scores for the tokens used to satisfy the query. That is, the more that the tokens used to satisfy the query are relevant to the document, the more relevant the document is deemed to be to the query.

As set forth above, in determining a document relevance score, the data processing system may determine a separate token relevance score for each of the tokens in the document used to satisfy the query expression. The token relevance score is indicative of the relevance of the token to the document from which it was extracted. The token relevance score may reflect weight given to the token based on one or more factors, including, for example, text format, language aspect, or document relation factors. In some implementations, the token relevance score also incorporates a weight reflecting a historical performance of similar tokens used as keywords.

Examples of text format factors include font name, font type, font size, font color, background color, hidden aspect, bold, underline, strikethrough, double strikethrough, all capitals, small capitals, and italics. Examples of language aspect factors include a lexical classification such a part of speech, e.g., noun, verb, or preposition, and indication of common usage, e.g., a frequency for which the token appears in a statistically relevant sample of documents in the language. Examples of document relation factors include the token's location within the document (e.g., as a document region, document section, heading level such as title, or the position of the token with respect to the other tokens), frequency of the token's occurrence within the document, document encoding (i.e., whether the token is part of the document internals, e.g., a markup tag, an html tag, an xml tag, internal script, internal code, or a comment field), whether the token is hidden from display, and differences between the features of the document token and the features of other document tokens in the same document.

In some implementations, the token relevance score also reflects weighting factors for media attributes such as tags (e.g., artist, creation date, camera, camera settings) or objects identified within media (e.g., text within the media, faces identified in the media, locations identified within the media, or structures identified within the media). Media includes, but is not limited to, still images, animated images, video, and audio.

The data processing system 150 aggregates the weighting factors for a token to determine the token relevance score for that token. For example, "insurance" may have a high aggregate score if it is in the document's title and is formatted to be bold and in a large font size. Alternatively, "insurance" may have a low score if it only appears within an HTML comment section at the end of the document.

In some implementations, an additional supplement relevance score is determined for the significance of the tokens to the supplemental content indicated by the content record associated with the satisfied query expression. That is, in some cases certain components of a query expression are more relevant to an item of supplemental content than other components of the query expression. Consider, for example, the Boolean query expression "car OR insurance" associated with a car insurance advertisement. In this case, the word "insurance" may be more relevant to the advertisement than the word "car." Thus, even though a document pertaining to car radios may satisfy the query expression, the documents relevance would be determined to be lower than a document related to homeowners insurance. In some implementations, each token relevance score is adjusted by the respective supplement relevance score.

The data processing system 150 then aggregates the token relevance scores for each token used to satisfy a query expression to arrive at the document relevance score. The query expressions obtaining the best (e.g., highest) document relevance scores are generally deemed to be associated with the most relevant supplemental content for the document.

The data processing system 150 then selects content to be delivered with the requested document (step 490) based on the determined document relevance scores of the Boolean query expressions satisfied by the document (e.g., as determined in step 480). For example, the content record associated with the query expression satisfied by the requested document with the best (e.g., highest) document relevance score is selected. The content indicated by the selected content record is then caused to be delivered with the requested document to the user device. For example, the content record, content referred to by the content record, or a URL specified in the content record, is output to a content delivery system or output directly to the user device 126.

In some implementations, multiple query expressions for which the document is relevant are used to determine the supplemental content to be provided with the document. For example, the N query expressions with the N best (e.g., highest) document relevance scores may be used to select multiple items of associated supplemental content to be delivered.

Referring back to FIG. 2, as introduced above, the computer system or computing device 200 may be employed to implement any of the computer systems discussed herein, in accordance with some implementations, including implementation of the system 100, content publisher 120, supplemental content provider 122, user device 126, data processing system 150, query processing module 154, scoring module 158, database (or repository) 170, and any other computer system used. The computer system 200 can be used to provide information via the network 110 and to evaluate data, e.g., to determine Boolean query expressions, to identify documents satisfying query expressions, to determine relevance scores for documents satisfying query expressions, and to use the scores to identify content to provide for display with a web page.

The computer system 200 of FIG. 2 comprises one or more processors 250 communicatively coupled to memory 270 and one or more communication or network interfaces 210. Generally, the computer system 200 includes an I/O interface for receiving input via one or more input devices 224 (e.g., a keyboard, mouse, or touch screen) and producing output to one or more output devices 226 (e.g., a display, a screen, a touch screen, or speakers). The processors 250 can be included in the data processing system 150 or the other components of the system 100 such as the query processing module 154 or the scoring module 158.

In the computer system 200 of FIG. 2, the memory 270 may include any non-transitory computer-readable storage media, and may store computer instructions such as processor-executable instructions for implementing the various functionalities described herein for respective systems, as well as any data relating thereto, generated thereby, or received via the communications interface(s) or input device(s) (if present). The processor(s) 250 shown in FIG. 2 may be used to execute instructions stored in the memory 270 and, in so doing, also may read from or write to the memory 270, and to cache memory 275, various information processed and or generated pursuant to execution of the instructions.

The processor 250 of the computer system 200 shown in FIG. 2 also may be communicatively coupled to or control the communication or network interface(s) 210 to transmit or receive various information pursuant to execution of instructions. For example, the network interface(s) 210 may be coupled to a wired or wireless network, bus, or other communication means and may therefore allow the computer system 200 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 200.

The input device(s) 224 may be provided, for example, to allow a user to make manual adjustments, make selections, enter data or other information, or interact in any of a variety of manners with the processor during execution of the instructions. The output devices 226 of the computer system 200 shown in FIG. 2 may be provided, for example, to allow information to be viewed or otherwise perceived in connection with execution of the instructions. The input device 224 and the output device 226 may be the same device, such as a touch screen interface.

The processor 250 of the computer system 200 shown in FIG. 2 also may be communicatively coupled to one or more peripheral interfaces 230, e.g., a USB device, memory, disk drive, printer, or media device (e.g., a CD, DVD, or Blu-Ray player). Peripherals may be external to the computer system 200, separated by an interface (e.g., a USB interface) or housed within the computer system 200 and more closely connected, (e.g., a SCSI hard-disk drive).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer-readable storage media for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices).

Some of the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, digital pad, tablet PC, or other computing device.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The query processing module 154 and the scoring module 158 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a LCD (liquid crystal display) monitor, LED or OLED screen, a CRT (cathode ray tube), a plasma screen, or a projector, for displaying information to the user and a touch screen, keyboard, or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 200 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements. References to "or" may be construed as inclusive so that any terms described using "or" may indicate any of a single, more than one, and all of the described terms.

Thus, particular implementations of the subject matter have been described. Other implementations are within the scope of the following claims.

What is claimed is:

1. A computer implemented method of selecting supplemental content for a document, the method comprising:
receiving, by a data processing system, a notification of a request coming from a user device for a document;
parsing the requested document into one or more tokens and determining a token priority score for each token;
selecting a subset of tokens from the one or more tokens, each token in the subset of tokens having a token priority score above a predetermined threshold value;
accessing, by the data processing system, a set of Boolean query expressions stored in association with a plurality of supplemental content records;
identifying a subset of Boolean query expressions from the set of Boolean query expressions, each Boolean query expression in the identified subset of Boolean query expressions satisfied by the selected subset of tokens;
determining a document relevance score for each Boolean query expression in the identified subset of Boolean query expressions, wherein each determined document relevance score reflects a relevance of the requested document to a corresponding Boolean query expression;

selecting a Boolean query expression from the subset of Boolean query expressions that is best satisfied by the requested document based on the determined document relevance scores;

selecting a supplemental content record associated with the selected Boolean query expression; and outputting data for supplementing the requested document with content indicated by the selected supplemental content record.

2. The method of claim 1, wherein the document is a web page configured to be displayed with one or more advertisements and the supplemental content record is for an advertisement.

3. The method of claim 1, wherein the document is a web page, the method further comprising delivering the content indicated by the selected supplemental content record for display with the web page.

4. The method of claim 1, wherein each supplemental content record in the plurality of supplemental content records includes a keyword, and each supplemental content record is stored in association with at least one Boolean query expression derived from the keyword.

5. The method of claim 1, wherein the document relevance score is calculated using at least one of:

format, font name, font type, font size, font color, background color, hidden aspect, bold, underline, strikethrough, double strikethrough, all capitals, small capitals, or italics of a token from the subset of tokens.

6. The method of claim 1, wherein the document relevance score is calculated using at least one of:

location within the document, document region, document section, heading level, lexical classification, document encoding, document encoding comment, and media attribute of a token from the subset of tokens.

7. The method of claim 1, wherein the document relevance score is calculated using a number of occurrence of a token from the subset of tokens within the document and a relative frequency.

8. The method of claim 1, wherein the document relevance score is calculated using is a difference between a first token and a second token in the selected subset of tokens.

9. The method of claim 1, wherein determining the document relevance score comprises determining a document relevance score for each Boolean query expression in the identified subset of Boolean query expressions, wherein each determined document relevance score reflects an aggregate of separately determined token relevance scores of a corresponding Boolean query expression to the selected subset of tokens.

10. The method of claim 1, wherein determining the document relevance score comprises aggregating separately determined supplement relevance scores for each token that contributed to the satisfaction of the respective Boolean query expression.

11. A system of selecting supplemental content for a document, the system comprising:

at least one computer processor configured to execute instructions; and a computer readable storage medium communicatively coupled with the at least one computer processor, the medium storing instructions, which, when executed by the at least one computer processor, cause the at least one processor to:

receive a notification of a request coming from a user device for a document;

parse the requested document into one or more tokens and determining a token priority score for each token;

select a subset of tokens from the one or more tokens, each token in the subset of tokens having a priority score above a predetermined threshold value;

access a set of Boolean query expressions stored in association with a plurality of supplemental content records;

identify a subset of Boolean query expressions from the set of Boolean query expressions, each Boolean query expression in the identified subset of Boolean query expressions satisfied by the selected subset of tokens;

determine a document relevance score for each Boolean query expression in the identified subset of Boolean query expressions, wherein each determined document relevance score reflects a relevance of the requested document to a corresponding Boolean query expression;

select a Boolean query expression from the subset of Boolean query expressions that is best satisfied by the requested document based on the determined document relevance scores;

select a supplemental content record associated with the selected Boolean query expression; and output data for supplementing the requested document with content indicated by the selected supplemental content record.

12. The system of claim 11, wherein the document is a web page configured to be displayed with one or more advertisements and the supplemental content record is for an advertisement.

13. The system of claim 11, wherein the document is a web page, the system further configured to deliver the content indicated by the selected supplemental content record for display with the web page.

14. The system of claim 11, wherein the document relevance score is calculated using at least one of:

a text format, a language aspect, and a document relation factor of a token from the subset of tokens.

15. The system of claim 11, wherein the document relevance score is calculated using at least one of:

location within the document, document region, document section, heading level, lexical classification, document encoding, document encoding comment, and media attribute of a token from the subset of tokens.

16. A computer-readable storage medium storing processor executable instructions, which, when executed by at least one processor, cause the at least one processor to:

receive a notification of a request coming from a user device for a document;

parse the requested document into one or more tokens and determining a token priority score for each token;

select a subset of tokens from the one or more tokens, each token in the subset of tokens having a token priority score above a predetermined threshold value;

access a set of Boolean query expressions stored in association with a plurality of supplemental content records;

identify a subset of Boolean query expressions from the set of Boolean query expressions, each Boolean query expression in the identified subset of Boolean query expressions satisfied by the selected subset of tokens;

determine a document relevance score for each Boolean query expression in the identified subset of Boolean query expressions, wherein each determined document relevance score reflects a relevance of the requested document to a corresponding Boolean query expression;

select a Boolean query expression from the subset of Boolean query expressions that is best satisfied by the requested document based on the determined document relevance scores;

select a supplemental content record associated with the selected Boolean query expression; and output data for supplementing the requested document with content indicated by the selected supplemental content record.

17. The computer-readable storage medium of claim 16, wherein the document is a web page configured to be displayed with one or more advertisements and the supplemental content record is for an advertisement.

18. The computer-readable storage medium of claim 16, wherein the document is a web page and the processor executable instructions, when executed by the at least one processor, further cause the at least one processor to deliver the content indicated by the selected supplemental content record for display with the web page.

19. The computer-readable storage medium of claim 16, wherein the document relevance score is calculated using a location of a token from the subset of tokens within the document.

20. The computer-readable storage medium of claim 16, wherein the document relevance score is calculated using a number of occurrence of a token from the subset of tokens within the document and a relative frequency.

\* \* \* \* \*